US010729148B2

(12) United States Patent
Wirtz

(10) Patent No.: US 10,729,148 B2
(45) Date of Patent: Aug. 4, 2020

(54) VERTICAL FOOD SMOKER

(71) Applicant: Jerry Wirtz, Ponca City, OK (US)

(72) Inventor: Jerry Wirtz, Ponca City, OK (US)

( * ) Notice: Subject to any disclaimer, the term of this patent is extended or adjusted under 35 U.S.C. 154(b) by 256 days.

(21) Appl. No.: 15/817,491

(22) Filed: Nov. 20, 2017

(65) Prior Publication Data

US 2019/0150460 A1 May 23, 2019

(51) Int. Cl.
*A23B 4/052* (2006.01)
*A47J 37/07* (2006.01)

(52) U.S. Cl.
CPC ............ *A23B 4/052* (2013.01); *A23B 4/0523* (2013.01); *A47J 37/0704* (2013.01); *A47J 37/0786* (2013.01); *A47J 2037/0795* (2013.01)

(58) Field of Classification Search
CPC ............ A47J 2037/0795; A47J 37/0704; A47J 37/0786; A23B 4/052; A23B 4/0523; A23B 4/044; A23B 4/048; A23B 4/0526; A23B 4/056
USPC ................................ 99/480–482; 126/79, 84
See application file for complete search history.

(56) References Cited

U.S. PATENT DOCUMENTS

| 3,971,308 | A  | * | 7/1976  | Parker     | A23B 4/052  |
|           |    |   |         |            | 99/467      |
| 7,241,466 | B2 | * | 7/2007  | Dellinger  | A47J 37/0713|
|           |    |   |         |            | 426/523     |
| 10,413,124| B2 | * | 9/2019  | Morelock   | A47J 37/0713|
| 2001/0035176 | A1 | * | 11/2001 | Bush, III | A47J 37/0704|
|           |    |   |         |            | 126/25 R    |

OTHER PUBLICATIONS

Patent Lyo.*

* cited by examiner

*Primary Examiner* — Michael G Hoang
(74) *Attorney, Agent, or Firm* — Edward L. White

(57) ABSTRACT

A smoker for imparting flavor to food comprising at least one smoking chamber, a lower chamber disposed below and in open communication with the bottom of smoking chamber, more than one flat, externally rotatable fire shield disposed below the cooking rack within the lower chamber, at least one firebox removably disposed within the lower chamber below the fire shields, the firebox having an outer door covering the firebox opening when the firebox is deployed inside the lower chamber, a handle, sidewalls and at least one bottom grate defining a support for a combustible material, slider means for supporting the firebox, an air intake below the firebox within the lower chamber, and an ember plate disposed outside of the lower chamber, whereby a combustible material is ignited in the firebox while disposed outside of the lower chamber, then pushed into the lower chamber to smoke the food.

7 Claims, 5 Drawing Sheets

VERTICAL FOOD SMOKER

CROSS-REFERENCE TO RELATED APPLICATIONS

None.

FIELD OF THE INVENTION

The invention generally relates to a smoker for smoke-curing meats and other foods. In particular, the invention relates to an apparatus for up-flow smoking with direct heat to smoke-cure the desired foods.

BACKGROUND

Many smokers use indirect heat and smoke to cure food. Indirect heat smokers require the smoking chamber to be opened to replenish the smoking material. The disadvantage to this design is that every time the smoker is opened, the temperature drops in proportion with the time the smokers is open, and this increases the time needed to smoke the food due to the temperature loss. Smokers that do not require opening the smoking chamber but have another method for replenishing the smoking materials usually require the opening of a door which still results in heat loss though to a lesser extent than those that require opening the smoking chamber. Current smoker designs allow airflow for the smoking process but do nothing to control and utilize the airflow to affect the smoking process. The smokers that utilize ports for air intake typically do not protect the ports from falling debris and this debris may block and clog the ports thus leading to uneven air flow and uneven cooking.

The different smoker designs described above have significant disadvantages such as uneven cooking, time consuming operation and ultimately inefficient operation.

SUMMARY OF THE INVENTION

The present invention overcomes these shortcomings by providing an apparatus that allows a user to smoke foods using direct heat, minimizing heat loss during the restoking process, and up-flow smoke. The apparatus may consist of an upper smoking chamber with a door to access the food, a lower chamber with air intakes, a fire shield, and a firebox to accept the combustible materials. A user places the food in the smoke chamber, places combustible material in the firebox and ignites said material and uses the fire shield to control the airflow into the smoker and the temperature at which the food is smoked.

There have thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in this application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. Additional benefits and advantages of the present invention will become apparent to those skilled in the art to which the present invention relates from the subsequent description of the preferred embodiment and the appended claims, taken in conjunction with the accompanying drawings. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

DETAILED DESCRIPTION OF THE INVENTION

Figure 1:
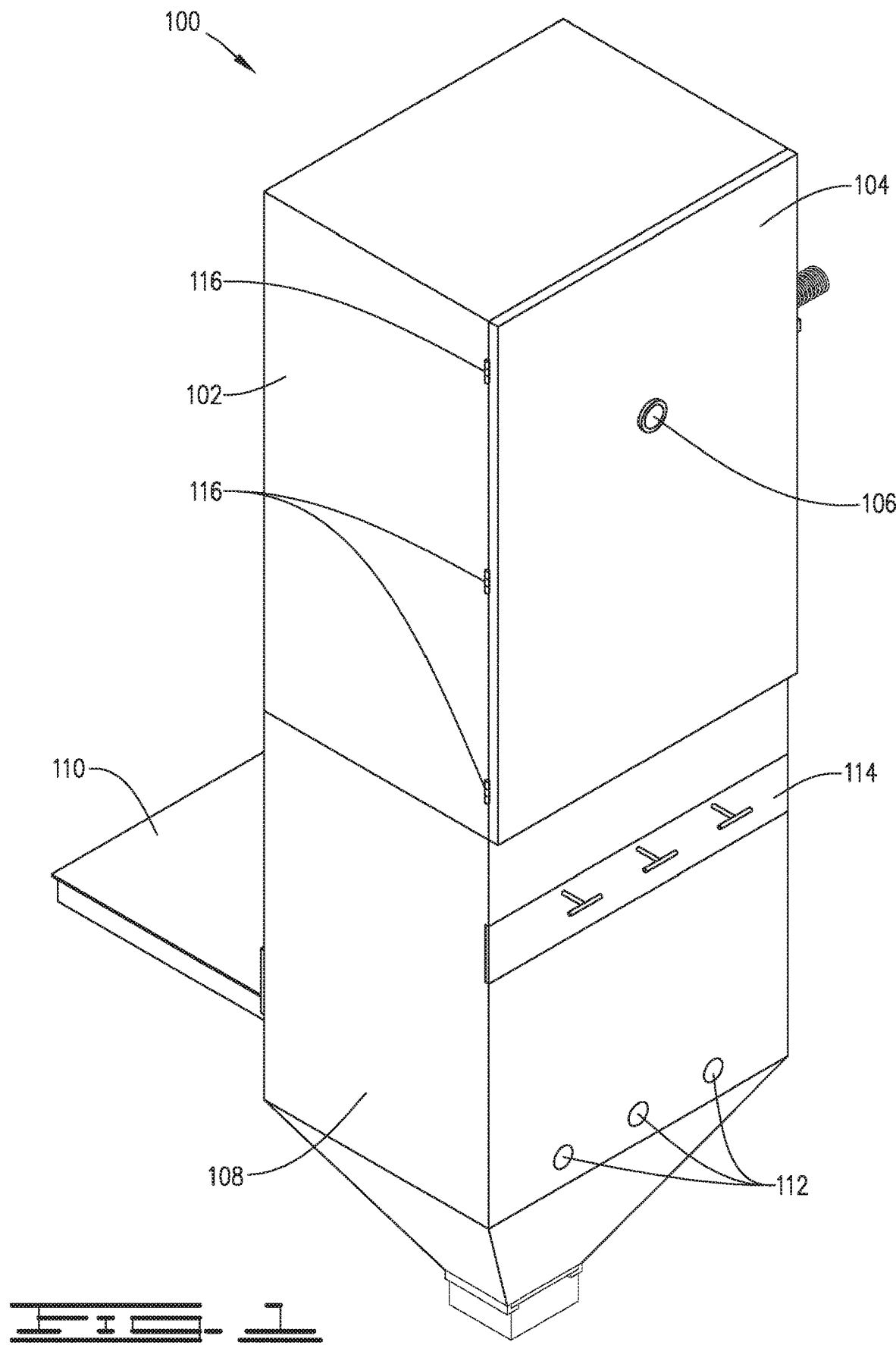
FIG. 1 is a perspective front view of the smoker.

FIG. 1 is a perspective front view of the smoker 100. The smoker 100 may comprise a smoking chamber 102, a smoking chamber door 104, a temperature gauge 106, a lower chamber 108, an ember plate 110, an air intake 112, and a fire shield 114. In the preferred embodiment, the smoking chamber door 104 is hingedly attached with hinges 116 to the smoking chamber 102. A high temperature seal may be attached to the smoking chamber door 104 or to the smoking chamber 102 to maintain the inside temperature and prevent the smoke from escaping. The smoking chamber door 104 allows access to the interior of the smoking chamber 102 where foods that are desired to be smoked such as meats, cheeses and other types of foods are placed within the smoking chamber 102 on racks 302 for the smoking process. Affixed to the smoking chamber door 104 is a temperature gauge 106 to monitor the temperature inside the smoking chamber 102 without opening the smoking chamber door 104 and will also allow a user to monitor the temperature inside the smoking chamber 102 while modifying the temperature by changing the position of the adjustable dampers 414 of the fire shield 114. The smoking chamber 102 and the lower chamber 108 are preferably rectangular and the lower chamber 108 is affixed to the smoking chamber 102 and disposed beneath the smoking chamber 102.

The lower chamber 108 may comprise a fire shield 114, a firebox 202 (not pictured), and ember plate 110 and at least one air intake 112. This fire shield 114 controls the air flow from the air intakes 112 into the smoking chamber 102. By the fire shield 114 controlling the airflow from the air intakes 112, the fire shield is able to control the amount of direct heat and smoke in the smoking chamber 102. The fire shield 114 will be described in further detail in FIGS. 4 and 5. The lower chamber 108 may have an ember plate 110 to prevent embers from falling to the ground when the firebox 202 is removed from its normal operating position to be refilled with combustible material 320. The ember plate 110 is slidably attached to the lower chamber 108 where the ember plate 110 may be slid into the lower chamber 108 when not in use or to further restrict airflow if desired. The lower chamber 108 may be placed on legs for a stationary positioning, on wheels for ease of mobility, or held in its operating position by another method known to one skilled in the art.

In the preferred embodiment, air 324 is drawn in through the air intakes 112 in the lower chamber 108 where the air 324 is further drawn across the firebox 202 containing the lit combustible materials 320 increasing the combustion of the materials and the heat from firebox 202. As the air 324 is drawn across the combustible materials 320, smoke and heat are generated creating smoky air 322 that flows through the fire shield 114 into the smoking chamber 102 to smoke the food. The fire shield 114 enables a user to control the amount of smoke and direct heat to be applied to the food by increasing or decreasing the heated smokey air 322 flowing through the adjustable dampers 414. Additionally, the meats products may create grease as they are cooked, and the grease generated may descend through the fire shield 114 on to the lit combustible material 320 in the firebox 202 creating more heated smokey air 322 with a different flavor profile.

Figure 2:
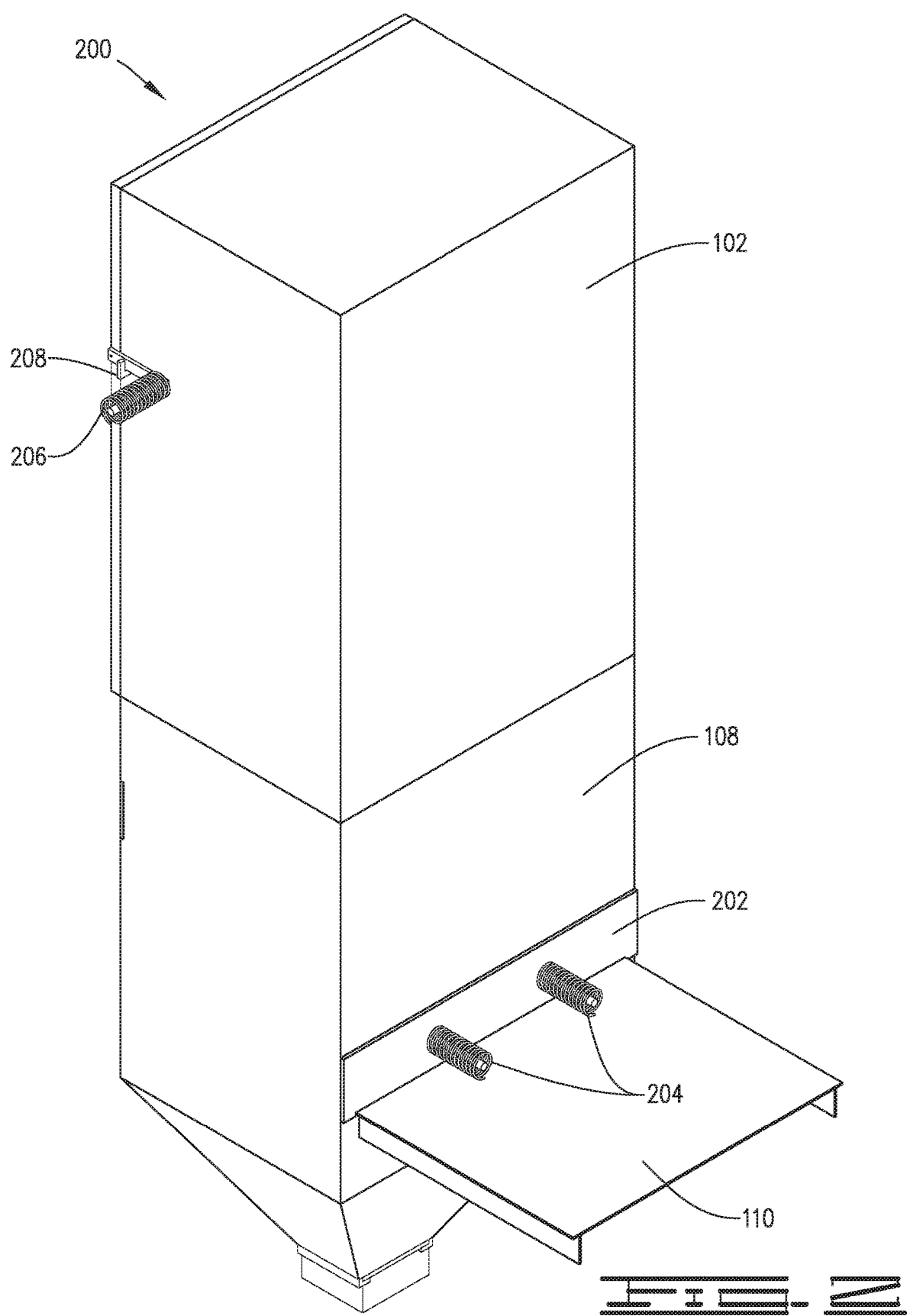
FIG. 2 is a perspective rear view of the smoker.

FIG. 2 is a perspective rear view 200 of the smoker 100. This view better depicts the firebox 202 in its operating position within the lower chamber 108. The firebox 202 is disposed above the ember plate 110 and below the fire shield 114. Attached to the firebox 202 may be firebox handles 204 to facilitate the firebox 202 removal. The firebox slider 316 supports the firebox 202 as it is slidably pulled out of and returned to the lower chamber 108. One skilled in the art may select a firebox slider that may include, but that is not limited to, slide rails affixed the sides of the lower chamber 108. The firebox handles 204 allow a user to remove the firebox 202 from its normal operating position to add additional combustible material 320 to the smoker 100. The user may slide the firebox 202 from its operating position to a loading position without completely removing it from the lower chamber 108 when replenishing the combustible material 320 in order to minimize heat loss. Once the combustible material 320 is lit in the firebox 202, it is slide into its normal operating position within the lower chamber 108.

The smoking chamber 102 may further consist of a smoking chamber handle latch 206 and a smoking chamber latch plate 208. In the preferred embodiment, a user rotates the smoking chamber handle latch 206 to engage and disengage the smoking chamber latch plate 208 to close and secure the smoking chamber door 104 and to unlock and open the smoking chamber door 104, respectively.

Figure 3:
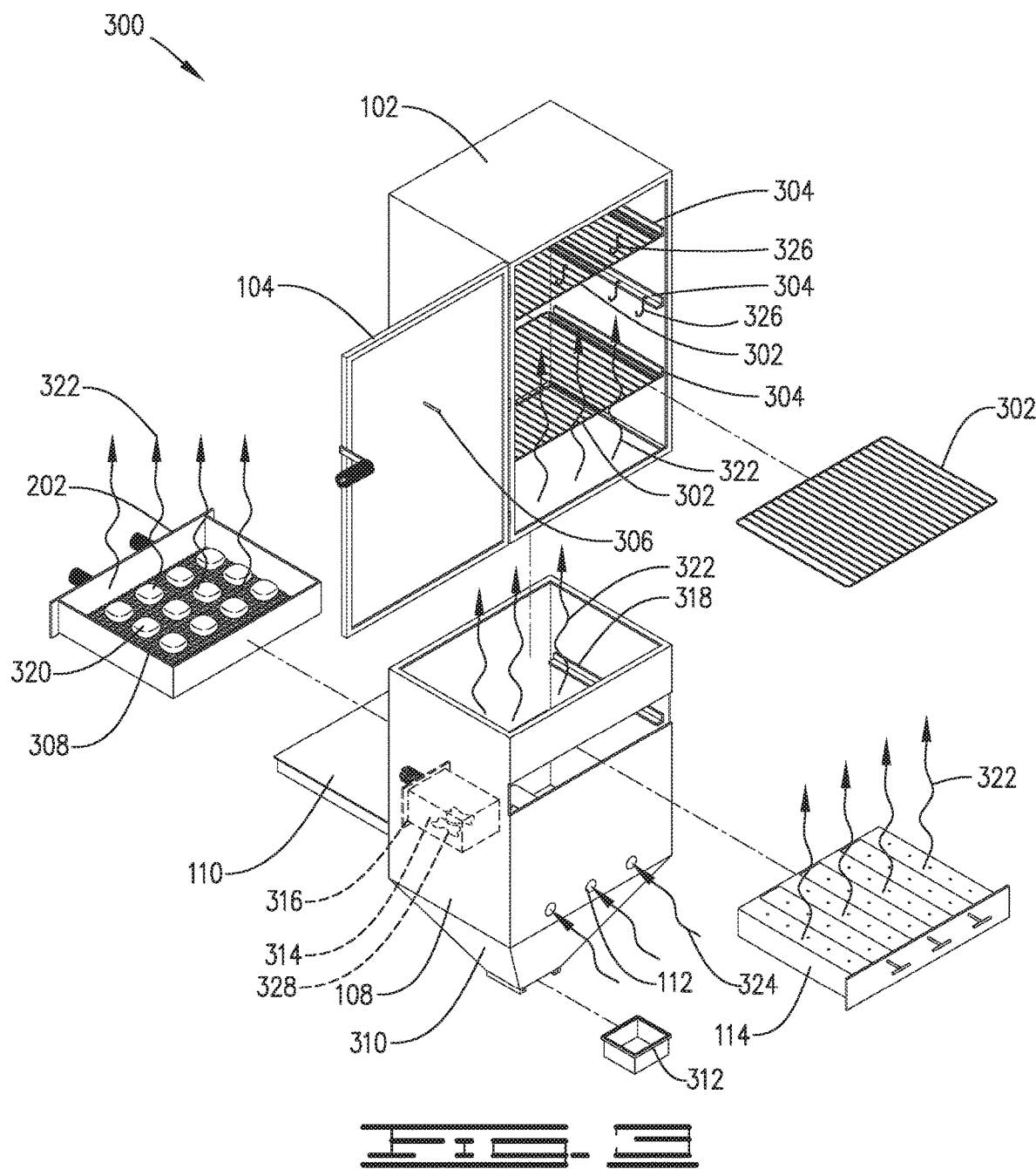
FIG. 3 is an exploded front view of the smoker.

FIG. 3 is an exploded perspective front view 300 of the smoker 100. This view 300 illustrates cooking racks 302, which slideably sets atop a plurality of slide rails 304. This configuration allows a user to slide the racks 302 along the top of the side rails 304 outside of the smoking chamber 102 to more easily place or remove food that is to be smoked on the racks 302. Once the food is placed on the rack 302, it is returned to the interior of the smoking chamber 102 for smoking. The racks 302 may be secured to the side rails 304 to prevent them from falling when in the extended positioned. Further, the side rails 304 may be adjustable to accommodate differing sizes of food, specifically different cuts of meat. The smoking chamber 102 may also allow hooks 326 to replace the racks 302 or allow a user to use combination thereof to cook a variety of foods concurrently.

Also illustrated in this view is the heat sensor 306 that protrudes from the smoking chamber door 104 inside the smoking chamber 102 where the sensor 306 detects the temperature within the smoking chamber 102 as the foods are being smoke-cured and displays the temperature on the temperature gauge 106. The smoking chamber 102 may support other temperature sensors and probes to make sure the meat is fully cooked.

Additionally, the firebox 202 may be rectangular as illustrated in this view, with sidewalls to contain the combustible material 320 within the firebox 202. One skilled in the art may select the appropriate height of side walls as required to maintain a desired amount of heat for specified amount of time to adequately cook the food. The bottom of the firebox 202 may be a grate 308 upon which the combustible material 320 rests. In a preferred method of smoking food, charcoal is placed on the grate 308 and then wet wood is placed on top of the charcoal to create the desired smoke for smoking food. As the firebox 202 slides back into the smoker 100, a lower scraping surface on the outer door scrapes any burning coals and ash that fell on the fire shield 114 back into the smoker 100, at which point they may fall down through the ash chute 310 into the ash reservoir 312. The chute 310 preferably has angled sides to focus the falling ashes into the ash reservoir 312, thus making it easier for the user to remove and dispose of the ashes. The firebox 202 allows for easy addition of combustible material 320 including, but not limited to, charcoal. Above the firebox 202, a smoke tray 314 capable of holding smoke-generating material, generally a hardwood may be placed such that heat from the firebox 202 cause the material to smoke. This smoke tray 314 may be fixed or removable. Additionally, this smoke tray 314 may also be used to reduce the heat on the side of the smoking chamber 102 where it is located allowing for foods requiring different temperatures to be smoked at the same time. The smoke tray 314 may be removed from smoke tray front plate 316 to allow for even heating throughout smoking chamber 102 and the smoke tray front plate 316 is re-installed on the smoking chamber 102 to cover the smoke tray 314 opening. In the preferred embodiment, the smoke tray 314 is slidably affixed to the lower chamber 108 allowing a user to add smoking material while minimizing heat loss. Other embodiments of the smoke tray 314 may include but are not limited to an access door to replenish the smoke generating-material.

A user may desire a flavor profile from the smoke generated from grease dripping from the meats and contacting the combustible material 320. The distance between the firebox 202 and the bottom of the smoking chamber 102 minimizes the direct effect from flare ups caused by grease falling down onto the combustible material 320. However, allowing the grease to contact the coals directly may create smoke with an improved flavor profile desired by the user. The flavor profile from, for example, wood smoke, is different from the grease smoke profile.

Figure 4:
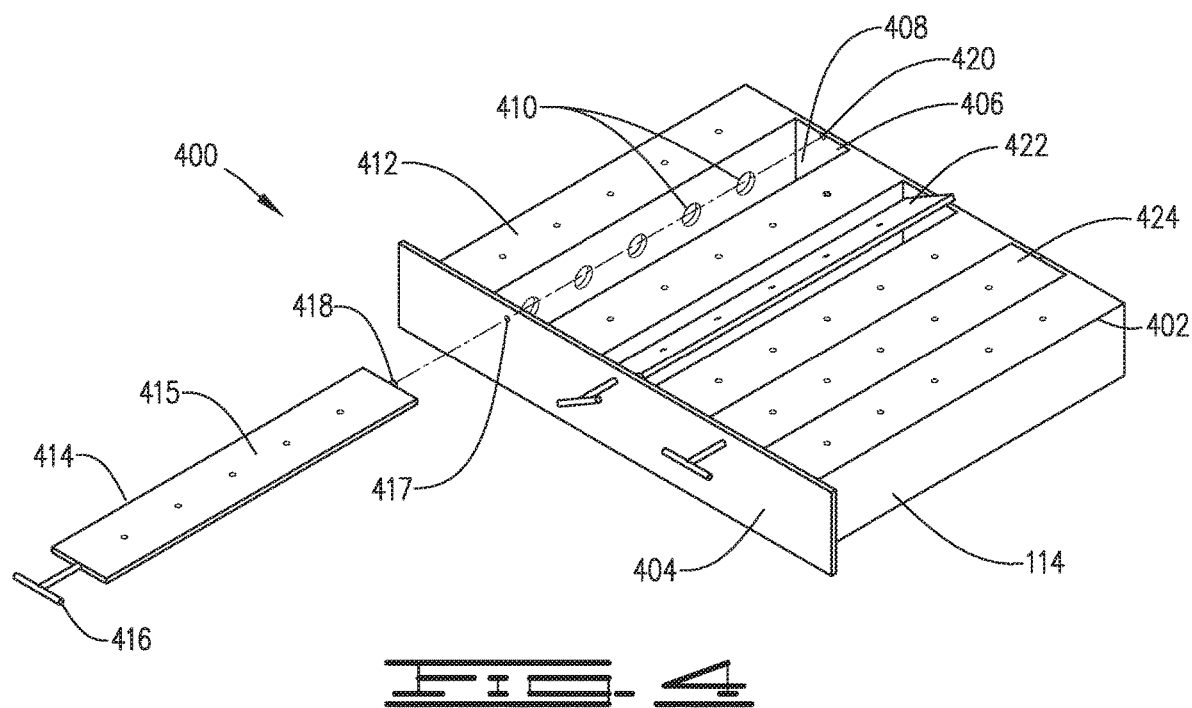
FIG. 4 is a perspective view of the fire shield.

FIG. 4 is a detailed perspective top view 400 of the fire shield 114. The fire shield 114 may comprise a fire shield body 402, a front plate 404, a rear plate 406, at least one cavity 408, air transfer holes 410, a fixed damper 412, and an adjustable damper 414. In the preferred embodiment, the fire shield body 402 has a front plate 404 affixed to the front of the fire shield body 402 and a rear plate 406 affixed to a to the rear of the fire shield body 402. Upon affixing the front plate 404 and the rear plate 406, a series of cavities may be created separated into lower cavities 504 on the underside of the fire shield 114 and upper cavities 408 on the topside of the fire shield 114 that may communicate through a series of air transfer holes 410 in the vertical sections of the fire shield body 402 that separate the upper and lower cavities 408, 504. In the preferred embodiment, the fixed damper 412 may be integrated with the fire shield body 402 allowing minimal airflow through a series of evenly spaced perforations 502 along the length of the fixed damper 412. One skilled in the art may choose a different configuration for spacing perforations 502 to obtain a desired airflow profile. There may be fixed dampers 412 disposed on the bottom and top of the fire shield body 402.

The adjustable damper 414 may comprise an adjustable damper plate 415, an adjustable damper T-handle 416, and an adjustable damper pin 418. The adjustable damper plate 415 may comprise a flat plate with evenly spaced perforations 502 along its length. One skilled in the art may choose different spacing and the amount of perforations to achieve a different desired effect. In other embodiments, the T-handle 416 may be replaced with other types of handles known to one skilled in the art to control the position of the adjustable damper 414. In the preferred embodiment, the adjustable damper plate 415 may substantially fill the opening to the upper cavity 408 to minimize airflow around the perimeter of the adjustable damper plate 415. The adjustable damper T-handle 416 may be centered and affixed to the front of the adjustable damper plate 415 and protrude through the front plate 404 through the T-handle hole 417 for easy access by the user. The adjustable damper pin 418 may be centered and affixed to the rear of the adjustable damper plate 415 and positioned to rotatably reside inside the adjustable damper pin socket 420. The combination of the adjustable damper T-handle 416 and the adjustable damper pin 418 allow a user to rotate and adjust the adjustable damper 414 to control the upward airflow. Each of the adjustable dampers 414 may be designed to rotate in a desired direction where that desired direction is intended to create optimal airflow as the adjustable dampers 414 are opened. In the preferred embodiment, a stopper may be used to ensure that the adjustable dampers 414 are only rotated in the desired direction.

Preferably, the fire shield 114 in this embodiment has seven dampers: four fixed 412, and three adjustable 414. All of the dampers 412, 414 have perforations 502 to allow minimal airflow even when the adjustable dampers 414 are in a closed position, and the dispersion of the perforations 502 ensures even airflow with the adjustable dampers 414 in a closed position. The partially opened damper 422 allows additional airflow from the lower chamber 108 into the smoking chamber 102 while the fully closed adjustable damper 424 allows only minimal airflow to keep the combustible material 320 lit. The fully opened adjustable dampers 414 provide the maximum airflow from the lower chamber 108 into the smoking chamber 102. The air flows into the air intake 112 through the air intake tubes 604 and out into the lower chamber 108 through the air distribution ports 702. The air 322 then enters the underside of the firebox 202 flows through the grate 308 and through the combustible material 320 then exits the top of the firebox 202 while increasing the combustion of the combustible material 320. The air 322 continues to flow into the lower cavities 504 of the fire shield 114. The air 322 depending on the positioning of the adjustable dampers 414 either flows through perforations 502 on the dampers 412, 414 to provide minimum airflow for combustion or flows through the perforations 502 on the fixed damper 412 and the lower cavities 504 which then transfers the air 322 to the upper cavities 408 through air transfer holes 410 positioned between the upper and lower cavities 408, 504 to increase the temperature and smoke in the smoking chamber 102.

Figure 5:
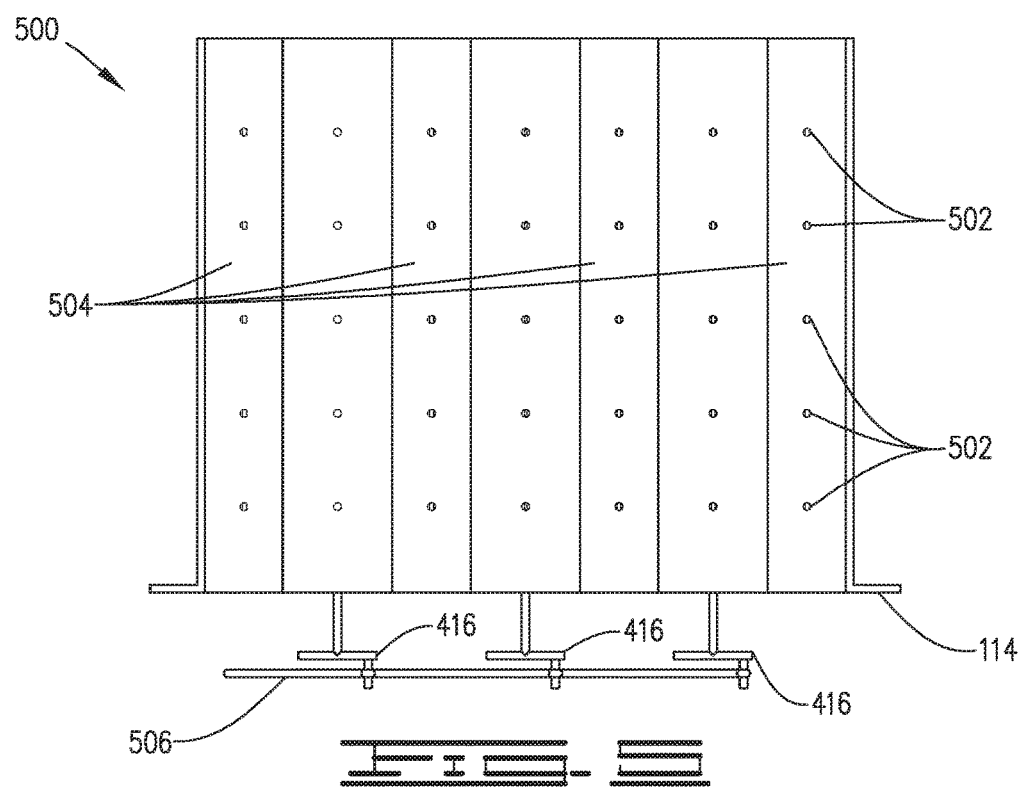
FIG. 5 is an underside view of the fire shield with an optional ganged damper handle shown.

FIG. 5 is an underside view 500 of the fire shield 114. The lower cavities 504 are depicted along with the perforations 502 in both the fixed and adjustable dampers 412, 414. The air 324 enters the air intakes 112 and flows into the lower chamber 108 where the air 324 is evenly distributed as it flows through the fire shield 114. The adjustable damper T-handle 416 of the adjustable damper 414 may be connected to a single ganged damper handle 506 that allows a user to adjust the adjustable dampers 414 by the same amount with a single movement.

Figure 6:
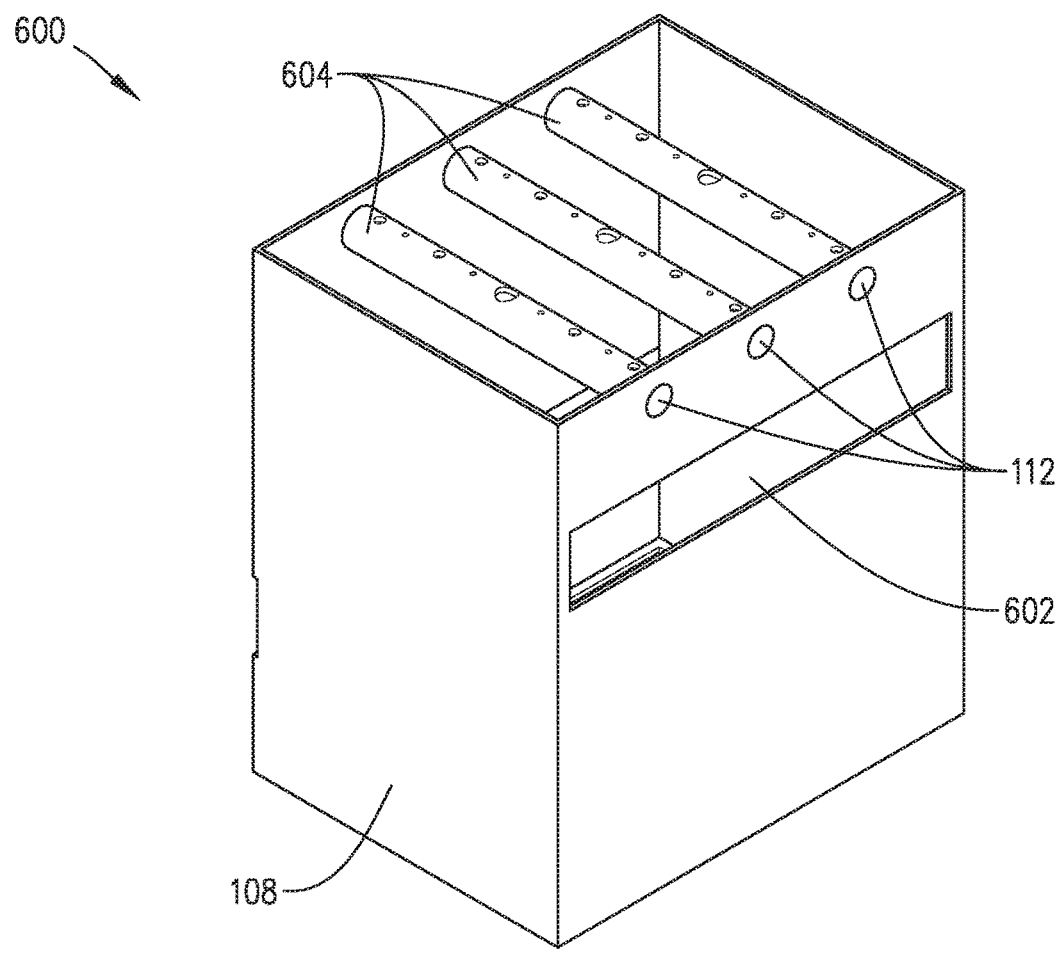
FIG. 6 is a perspective bottom view of the lower chamber in an inverted position.
Figure 7:
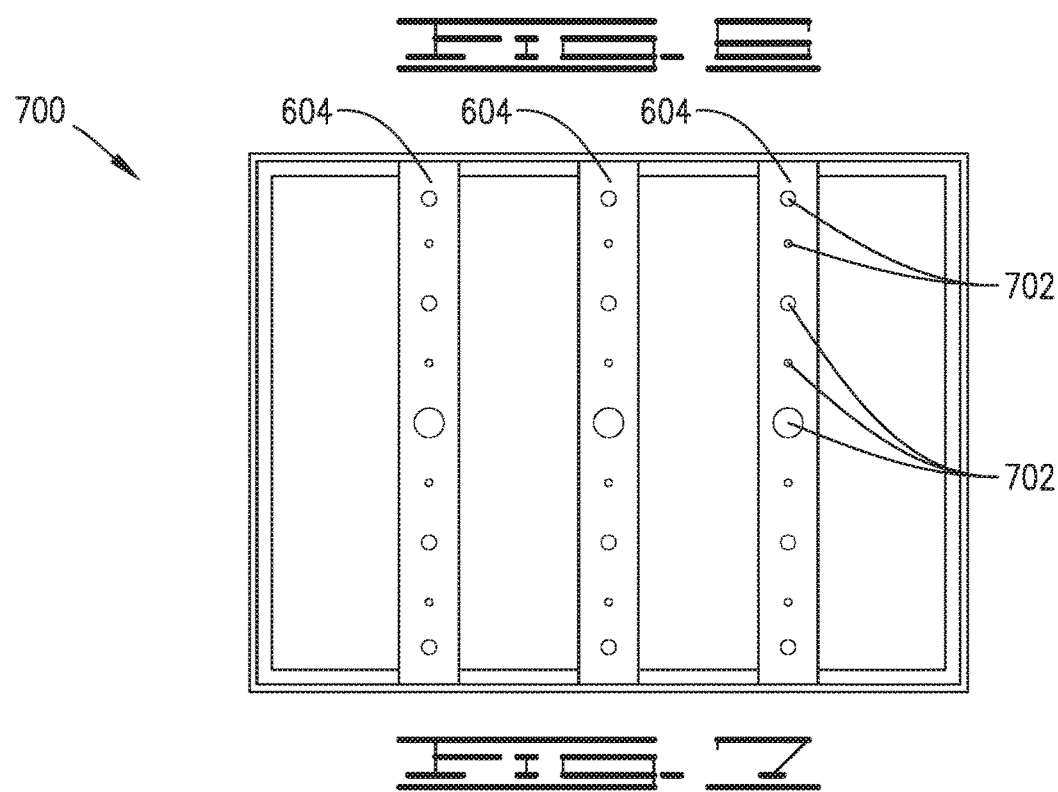
FIG. 7 is a detailed view of the air intake tubes in the lower chamber.

FIG. 6 and FIG. 7 are underside views 600 and 700 of the lower chamber 108. FIG. 6 is a perspective rear view 600 of the preferred embodiment of the lower chamber 108. This view 600 illustrates the lower chamber 108 with the firebox opening 602 and the air intakes 112 and the air intakes tubes 604. The air intake 112 may comprise an air intake tube 604 and air distribution ports 702 disposed on the underside of the air intake tubes 604. In the preferred embodiment, the lower chamber 108 has three air intake tubes 604 that are evenly spaced along the length of the lower chamber 108 and fully span the entire width of the lower chamber 108 allowing air 324 to enter the tubes 604 from openings on either side of the lower chamber 108. One skilled in the art may determine the size of the opening of the air intakes 112 and the diameter of the air intake tubes 604 to provide efficient and effective air intake. FIG. 7 is a bottom view 700 of the lower chamber 108 illustrating the air intake tubes 604 with the air distribution ports 702. In the preferred embodiment, a series of air distribution ports 702 are evenly spaced along the length of the air intake tubes 604. The air distribution ports 702 may vary in size to facilitate the airflow into the lower chamber 108 where the preferred embodiment employs a single large air distribution port 702 positioned in the center of each air intake tube 604 and a series of four air distribution ports 702 alternating in relative size from small and medium disposed to each side of the large center large air distribution port 702. This series of air distribution ports 702 creates a more even intake air flow into the chamber. Other methods of air distribution is available to one skilled in the art may to supply air to the lower chamber 108. Additionally, the placement of the air distribution ports 702 on the underside of the air intake tubes 604 may prevent falling coals and ash from clogging the air distribution ports 702.

Having thus described the invention, I claim:

1. A smoker comprising:
  a. at least one smoking chamber open at a bottom and having a door accessing the at least one smoking chamber and at least one cooking rack disposed therein;
  b. a lower chamber disposed below and in open communication with the bottom of the at least one smoking chamber, the lower chamber defining a vertical axis for upflow of heated, smokey air through its cross section;
  c. a plurality of flat, externally rotatable fire shields disposed below the at least one cooking rack within the lower chamber, each fire shield mounted transverse to the lower chamber's axis, and each fire shield having a size such that when the fire shields are rotated into a closed position, the fire shields cooperate to block substantially the entire cross section of the lower chamber, the fire shields further defining, in at least one of the fire shields, at least one hole therethrough, so that even when in a closed position, some heated, smokey air can flow up through each hole;

d. at least one firebox removably disposed within the lower chamber below the fire shields, the firebox having—
  i. an outer door covering a firebox opening when the firebox is deployed inside the lower chamber,
  ii. at least one handle,
  iii. sidewalls and at least one bottom grate defining a support for a combustible material,
  iv. a slider slidingly supporting the firebox, allowing the fire box to be pulled out of and returned to the lower chamber;

e. an air intake below the firebox within the lower chamber, the air intake comprising at least one air intake tube mounted transverse to the axis of the lower chamber with at least one end thereof receiving air through a ventilation hole in the lower chamber, the at least one air intake tube defining at least one air inlet hole on the at least one air intake tube's underside; and f. an external ember plate disposed outside of the lower chamber in a position where the ember plate is below the grate when the firebox is pulled outside of the lower chamber, whereby the smoker is configured for receiving a food item to be smoked in the at least one smoking chamber, the combustible material in the firebox to be consumed, producing a heat, a smoke, and a ash where the heat and smoke rise through the smoker controlled by the fire shields to cook and flavor the food item, and the ash passes the lower chamber and a ash chute and into a ash reservoir.

2. The smoker of claim 1, wherein the at least one cooking rack is configured to be adjustable.

3. The smoker of claim 1, wherein the at least one cooking rack is configured to be replaced with hooks.

4. The smoker of claim 1, wherein the at least one smoking chamber has at least one temperature sensor.

5. The smoker of claim 1, wherein the smoker has a tray for smoke generating material.

6. The smoker of claim 1, wherein a smoker tray is removable.

7. The smoker of claim 1, wherein the fire shields may be linked and operated as a single fire shield.

* * * * *